M. J. UNREIN.
HEADER ATTACHMENT FOR TRACTORS.
APPLICATION FILED MAY 23, 1916.
1,241,452.
Patented Sept. 25, 1917.
3 SHEETS—SHEET 1.
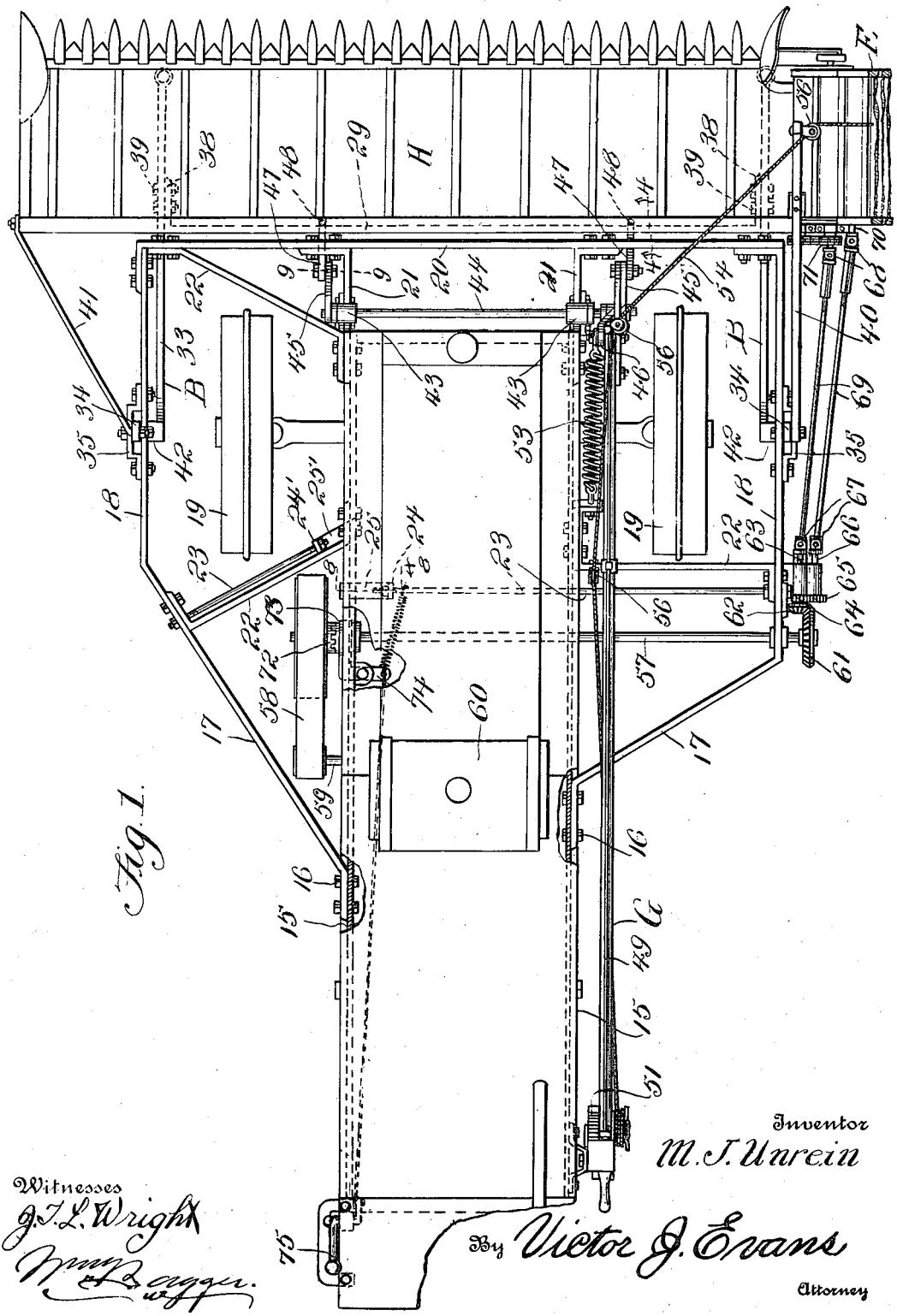

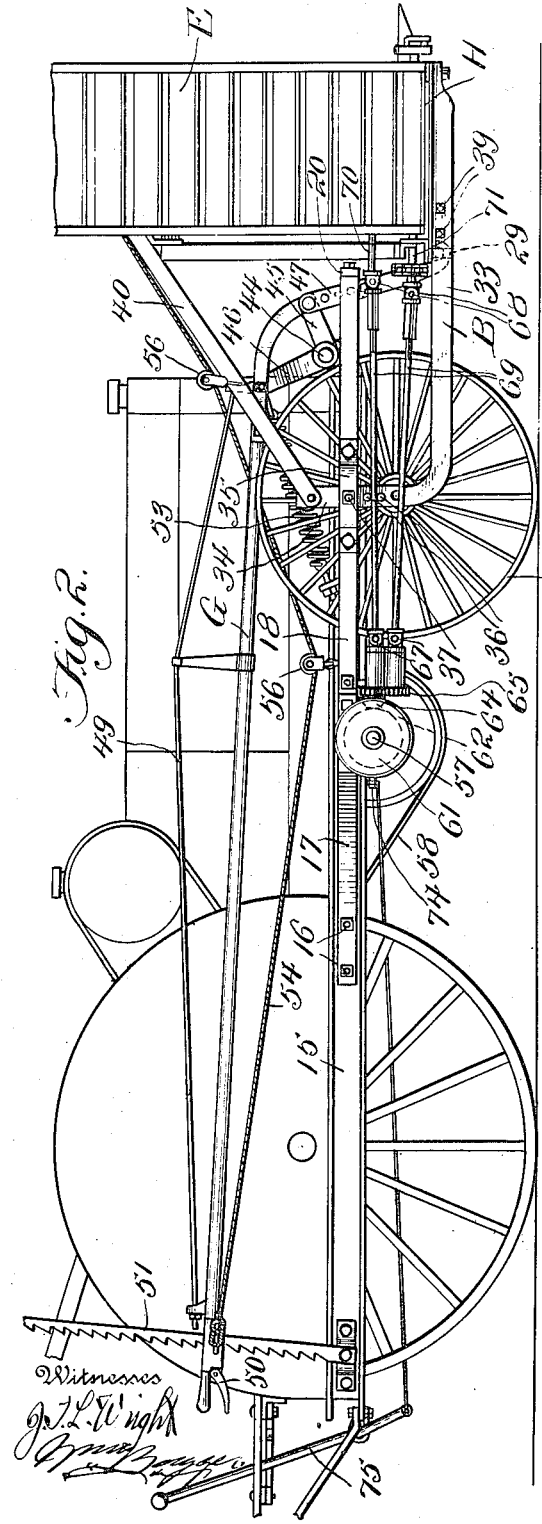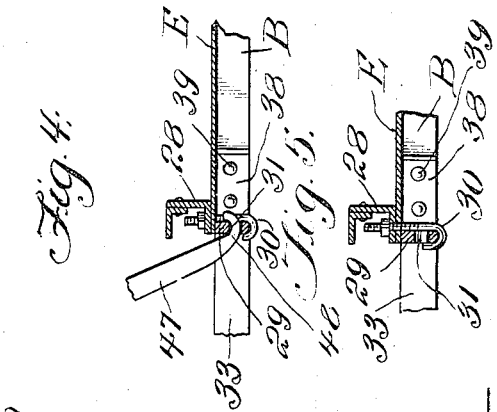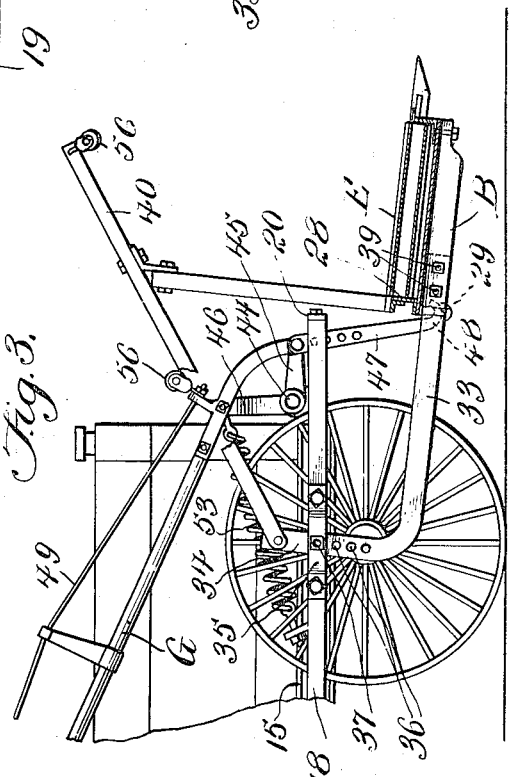

M. J. UNREIN.
HEADER ATTACHMENT FOR TRACTORS.
APPLICATION FILED MAY 23, 1916.
1,241,452.
Patented Sept. 25, 1917.
3 SHEETS—SHEET 3.
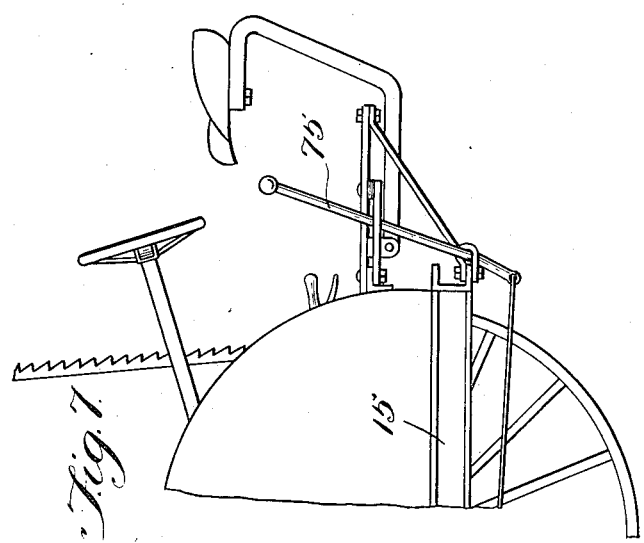
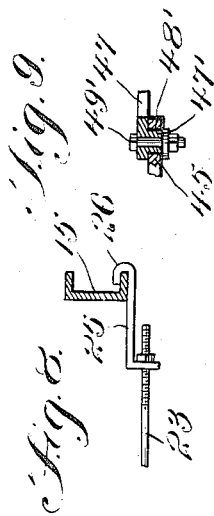
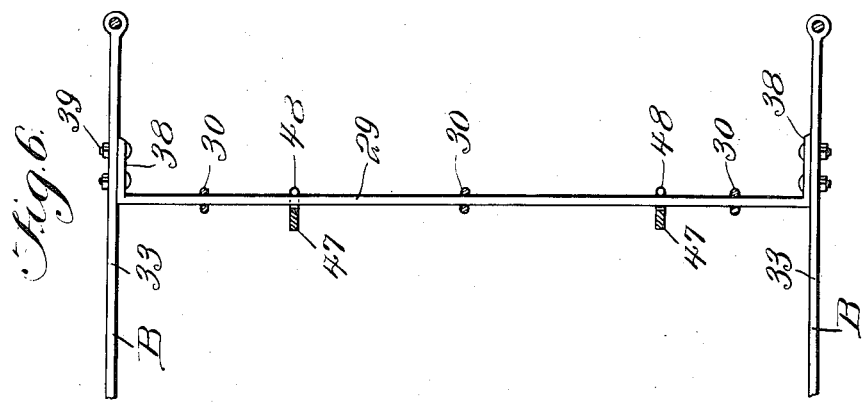

UNITED STATES PATENT OFFICE.

MICHAEL J. UNREIN, OF HAYS, KANSAS.

HEADER ATTACHMENT FOR TRACTORS.

1,241,452.                    Specification of Letters Patent.    Patented Sept. 25, 1917.

Application filed May 23, 1916.   Serial No. 99,400.

*To all whom it may concern:*

Be it known that I, MICHAEL J. UNREIN, a citizen of the United States, residing at Hays, in the county of Ellis and State of Kansas, have invented new and useful Improvements in Header Attachments for Tractors, of which the following is a specification.

This invention relates to attachments for tractors and specifically to header attachments for farm tractors.

The present invention has for its object to produce a device of simple and improved construction whereby a grain header of any well known and approved construction may be operatively connected with a tractor to be supported and actuated thereby.

A further object of the invention is to produce a simple and improved header attachment for tractors which will admit of the header being vertically adjusted and tilted to the most advantageous position for operation.

A further object of the invention is to produce a simple and improved header attachment for tractors whereby the header as well as the tractor will be controlled by one operator, thereby effecting an important saving of labor over devices that require the services of several operatives.

A further object of the invention is to produce a header attachment for tractors which may be easily and quickly disassembled, leaving the tractor free for other service.

A further object of the invention is to produce an improved header attachment for tractors which will in no wise interfere with the operation of the tractor or the steering abilities of the same, and in which on the other hand the mechanism of the header will in no wise be injuriously interfered with.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—

Figure 1 is a top plan view of the improved tractor attachment, diagrammatically showing as much of the tractor and of the header as is necessary for an understanding of the invention.

Fig. 2 is a view in side elevation of the same.

Fig. 3 is a view in side elevation of the forward portion of the device, showing the header tilted to a different position than in Fig. 2.

Fig. 4 is a sectional detail view taken on the line 4—4 in Fig. 1.

Fig. 5 is a view similar to Fig. 4, omitting the supporting hook.

Fig. 6 is a bottom plan view of the forward portion of the device showing the means for connecting the attachment with the header.

Fig. 7 is a view in side elevation of a rearward portion of the tractor taken from the opposite side to that shown in Fig. 2.

Fig. 8 is a sectional detail view taken on the line 8—8 in Fig. 1.

Fig. 9 is a sectional detail view taken on the line 9—9 in Fig. 1.

Corresponding parts in the several figures are denoted by like characters of reference.

The improved attachment is intended to be operatively mounted on practically any tractor of well known conventional construction, it being, of course, understood that such minor changes as may be necessary in the proportions or detailed construction of the parts of the device as may be found necessary to adapt the device to tractors of special construction will be regarded as wholly within the scope of the invention. The tractor frame illustrated in the drawings is of substantially rectangular shape, and it includes side members 15 which have been shown as being constructed of channel iron. Detachably mounted on the side members 15 by means of bolts 16 are obliquely disposed forwardly divergent brackets 17 having forwardly extending parallel arms 18 which are sufficiently spaced from the side members 15 of the tractor frame to afford ample room for the front wheels 19 whereby the tractor is steered. The arms 18 are connected together at their forward ends by a cross bar 20 which is located a convenient distance in front of the tractor frame. The cross bar 20 is directly connected with the forward ends of the side members of the tractor frame by means of angle braces 21 and braces 22, some of which have been shown as being diagonally disposed serving to reinforce the frame structure which consists of the side members of the tractor frame, the braces 17, the arms 18 and the cross bar 20, all of which parts are located in a common approximately horizontal plane. For the purpose of avoiding vibration as far as possible tension rods 23 are employed. One of said tension rods extends through one of the arms 18, through one side of the tractor frame and through an apertured lug 24 formed on a bracket 25 having a hook 26 that engages the other side member of the tractor frame, said tension rod being provided with a nut 27 which may be tightened so as to draw the parts tightly together. The other tension rod is similarly arranged, except that it engages one of the bracket members 17 and a lug 24' formed on a bracket member 25' that is connected with the side member of the tractor frame with which the bracket member 25 is connected. By tightening the nuts on the respective tension rods, it is found that the tendency to vibration is greatly reduced, the object of which will be readily apparent to any one skilled in the art to which the present invention appertains.

The header which is conventionally shown and which is designated by H has been shown as including in its structure a rear frame bar 28 of channel structure, said frame bar being shown as comprising two angle bars bolted together, as best seen in Figs. 4 and 5. Connected with the frame bar 28 and extending downwardly from the bottom flange thereof is a bar 29, said bar being securely but detachably connected with the frame bar 28 by means of hook bolts 30, and said bar 29 being provided with apertures 31, the use of which will be presently made apparent.

The main supporting members of the header consist of L-shaped brackets B including substantially horizontal arms 33 joined at their rearward ends with upwardly extending arms 34, said upwardly extending arms passing through keepers 35 that are mounted on the outer faces of the arms 18, said upwardly extending arms being each provided with a plurality of apertures 36 for the passage of a bolt or pivot member 37, whereby said arms are pivotally supported in such a fashion that they may be adjusted vertically to the most convenient position for successful operation. The header is supported on the forwardly extending arms 33 of the members B and the bar 29 which is connected with the header frame, as previously described, is provided with terminal flanges 38 that are secured on the arms 33 by means of bolts 39. In this manner the header will be very securely supported on the arms 33 of the supporting members B, which latter, it will be understood, are tiltable about the axes of the bolts or pivot members 37. The upper ends of the arms 34 may be connected with the header structure by the braces, indicated at 40 and 41, for the purpose of steadying the parts when in operation. The arms 34 have been shown as being provided with offsets 42 intermediate their upper and lower ends, but such offsets may be omitted.

The angle brackets 21 are provided with bearings 43 supporting a rock shaft 44 having radial arms 45, 46 that extend, respectively, forwardly and upwardly. Connected with the forwardly extending arm 45 are rods or bars 47 having terminal hooks 48 that engage the eyes or apertures 31 in the bar 30. Each of the members 47 is preferably provided with a boss or flange 47' engaging an aperture 48' in one of the arms 45 to enable the nut to be tightened on the connecting bolt 49' without tightening the joint between the members 45 and 47, enabling the members 47 to swing freely, as will be readily understood by reference to Fig. 9 of the drawings.

G is an adjusting lever, the forward end of which is securely connected with some of the arms 46 and 47 that extend radially from the rock shaft 44, said adjusting lever being extended rearwardly to a point within convenient reach of the operator for whom a seat is provided at the rearward end of the tractor and who, by means of the lever, may easily manipulate the rock shaft, thereby imparting a rocking movement to the supporting members B carrying the header, which latter may thus be moved vertically and tilted to the desired position, substantially as will appear by reference to Fig. 3 of the drawings. The adjusting lever G is reinforced by a truss member 49, and said lever is provided with a stop member 50 engaging a ratchet bar 51, whereby the parts may be retained securely at various adjustments.

The radially extending arm 46 of the rock shaft 44 is connected with one end of a spring 53, the other end of which is suitably connected with the tractor frame for the purpose of partly supporting it.

To effect adjustment of the header elevator E, a flexible element 54 is provided, one end of said element being connected with the elevator, and the other end with an arm of the lever G. The flexible element 54 is guided over conveniently arranged pulleys 56, one of which is supported by a forwardly extended portion of the brace 40.

For the purpose of actuating the movable parts of the header the tractor is provided with a special counter shaft 57 which is driven by a transmission belt 58 from a driven shaft 59 of the motor 60. The counter shaft 57 has a bevel gear 61 meshing with a bevel pinion 62 on a short shaft 63 which is connected by intermeshing spur wheels 64, 65 with a similar short shaft 66. The shafts 63 and 66, which are thus driven in opposite directions, are connected by means including universal couplings 67, 68 and telescoping shafts 69 with shafts 70 and 71 of the header. The power transmission means has been shown as including interengaging clutch members 72, 73, one of which is slidable on the counter shaft 57 on which it may be adjusted by a spring actuated shipping lever 74 which is suitably connected with a hand lever 75 which is conveniently located within reach of the operator. It will be understood that the means for transmitting power to the header here shown are merely for the purpose of illustration, and that the construction and arrangement of said transmission means may be varied.

It will be seen from the foregoing description, taken in connection with the drawings hereto annexed, that I have produced a tractor attachment of very simple and convenient construction by means of which a conventional header may be mounted upon and operatively connected with a tractor of almost any well known type. The construction and arrangement is such that the header may be very quickly mounted upon or disassembled from the tractor, leaving the latter free to be used for other purposes without great loss of time. Other means than a header may also be operatively connected with the tractor by the improved attachment without changes other than such as will readily suggest themselves to the mind of a skilled mechanic. The parts constituting the improved attachment are few in number and are capable of being manufactured and marketed at a very reasonable expense, placing the improved device within the reach of farmers whose means are limited. The parts constituting the improved attachment, when not in use, may be readily detached and disassembled for shipment or for storage in very small compass.

Having thus described the invention, what is claimed as new, is:—

1. In a header attachment for tractors, divergent brackets mounted on the side members of a tractor frame and having forwardly extending parallel arms, a cross bar connecting said arms and spaced forwardly of the tractor frame, and angle brackets connected with said cross bar and mounted on the side members of the tractor frame, in combination with braces spacing the divergent brackets and their arms from the tractor frame, and a tension device extending between one of the bracket members and the tractor frame, said tension device including a bracket member having hook connection with the tractor frame and provided with a lug and a tension rod connecting said lug with one of the bracket members.

2. In a device of the class described, the combination with a tractor frame, of a detachable frame structure connected with and surrounding the forward portion of the tractor frame, said frame structure including arms forming side members and a front cross bar, angle braces connecting the front cross bar with the tractor frame, a rock shaft supported on the angle braces and having radial forwardly and upwardly extending arms, L-shaped supporting members pivoted on the side members of the detachable frame structure and having forwardly extending arms and a cross bar connecting said arms, a header frame mounted on the arms of the supporting members and connected detachably with the cross bar, hook members connected with the forwardly extending radial arms of the rock shaft and engaging the cross bar with which the header frame is connected, and an adjusting lever fixedly connected with one of the radial arms of the rock shaft.

3. In a device of the class described, the combination with a tractor frame, of a detachable frame structure connected with and surrounding the forward portion of the tractor frame, said frame structure including arms forming side members and a front cross bar, angle braces connecting the front cross bar with the tractor frame, a rock shaft supported on the angle braces and having radial forwardly and upwardly extending arms, L-shaped supporting members pivoted on the side members of the detachable frame structure and having forwardly extending arms and a cross bar connecting said arms, a header frame mounted on the arms of the supporting members and connected detachably with the cross bar, hook members connected with the forwardly extending radial arms of the rock shaft and engaging the cross bar with which the header frame is connected, and an adjusting lever fixedly connected with one of the radial arms of the rock shaft, in combination with a lifting spring connecting a radial arm of the rock shaft with the tractor frame.

In testimony whereof I affix my signature.

MICHAEL J. UNREIN.